United States Patent [19]

Crane et al.

[11] Patent Number: 4,531,231
[45] Date of Patent: Jul. 23, 1985

[54] METHOD FOR DISTINGUISHING BETWEEN COMPLEX CHARACTER SETS

[75] Inventors: Hewitt D. Crane, Portola Valley; John S. Ostrem; Peter K. Edberg, both of Palo Alto, all of Calif.

[73] Assignee: Communication Intelligence Corporation, Menlo Park, Calif.

[21] Appl. No.: 459,283

[22] Filed: Jan. 19, 1983

[51] Int. Cl.³ .............................................. G06K 9/28
[52] U.S. Cl. ........................................ 382/13; 382/61
[58] Field of Search ........................ 382/10, 11, 13, 61

[56] References Cited

U.S. PATENT DOCUMENTS 4,021,777  5/1977  Shepard ................................ 382/61
4,139,837  2/1979  Liljenwall et al. .................... 382/13
4,284,975  8/1981  Odaka .................................. 382/13

OTHER PUBLICATIONS

"Pencept Users Manual for Penpad 320" first edition, Mar. 1984, Pencept, Inc. 39 Green Street, Waltham, MA 02154, pp. 3-4, 3-5.

Primary Examiner—Leo H. Boudreau
Assistant Examiner—Michael M. Murray
Attorney, Agent, or Firm—Townsend and Townsend

[57] ABSTRACT

A method for recognizing complex handwritten character set employs spatial position recognition in which characters of a first set are registered in a first region and characters of a second set are registered in a second region. The second region may be included within the first region. The invention is particularly useful for distinguishing Kanji from non-Kanji character sets in a data input system.

3 Claims, 3 Drawing Figures

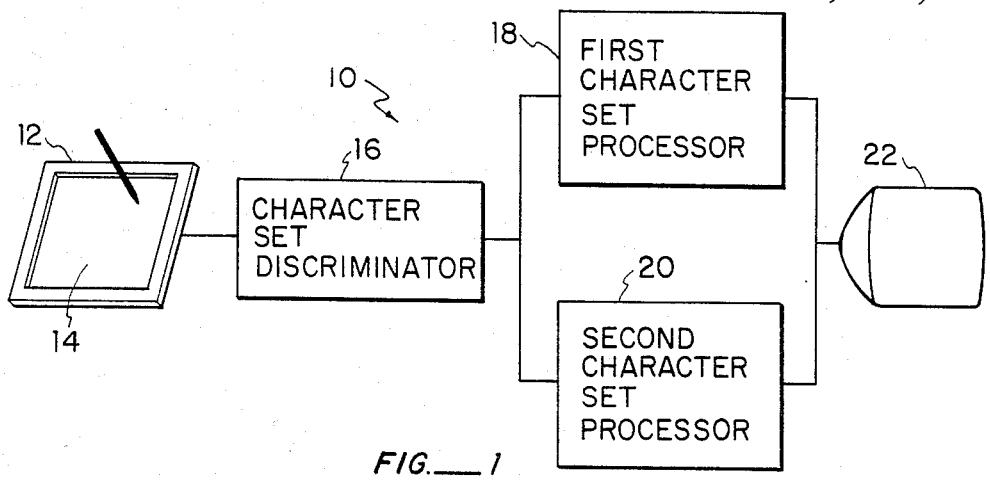
FIG._1
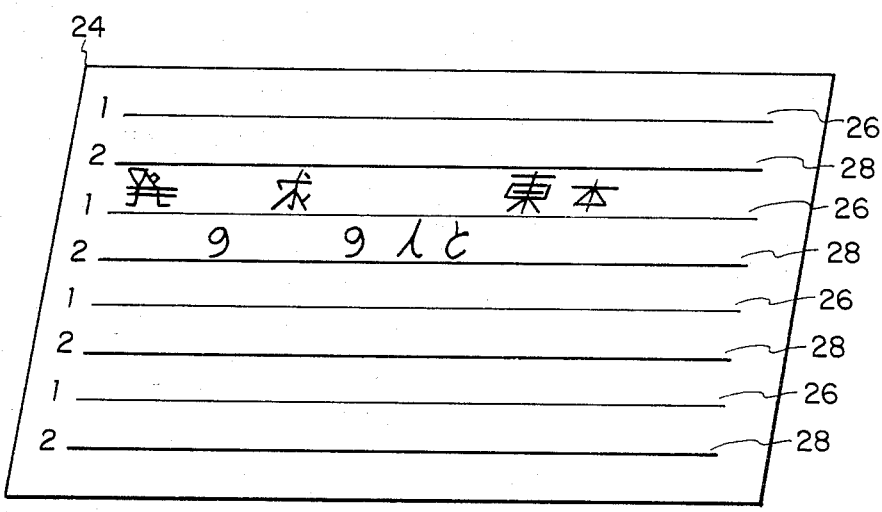
FIG._2
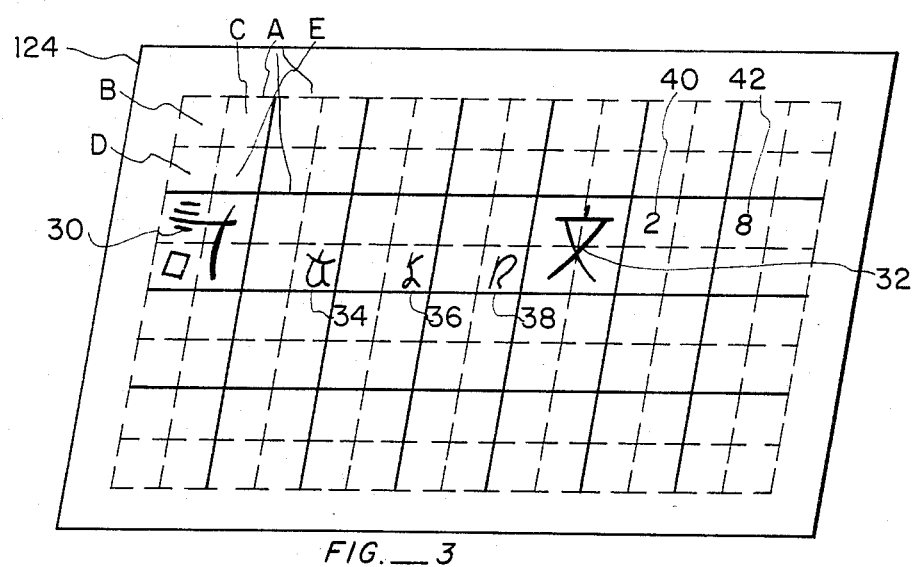
FIG._3

METHOD FOR DISTINGUISHING BETWEEN COMPLEX CHARACTER SETS

BACKGROUND OF INVENTION

1. Field of Invention

This invention relates to pattern recognition and particularly to recognition of complex handwritten characters including Chinese characters (Kanji), Hiragana characters and Katakana characters.

The recognition of complex characters has been pursued with limited success for many years. Various recognition schemes have been reported for hand registered characters. Schemes are typically based on spatial and certain limited shape characteristics of the strokes. One of the problems has been the differentiation between characters of different character sets. For example, in the Kanji system there are approximately 10,000 distinguishable characters in use, representing various syllables, words, phrases and concepts. Other character systems are known which are phonetic in nature. Examples are the Hiragana and the Katakana, which have considerably smaller character sets. Heretofore no one has reported an economical and effective automatic character recognition scheme whereby the character sets can be distinguished from one another.

2. Description of the Prior Art

Various methods for character recognition have been reported in the literature. Known systems have attempted to categorize characters on the basis of a general data base containing all possible characters. Due to the large potential data base, such schemes are typically expensive, cumbersome and slow. Commercially viable systems are heretofore unknown.

SUMMARY OF THE INVENTION

According to the invention, in a system employing a spatial stroke recognition means such as an x-y tablet, a method is provided for distinguishing between sets of handwritten characters whereby characters of a first character set are registered in a first area of the tablet and characters of a second character set are registered in a second area of the tablet. In a particular embodiment, the second area is totally contained within the first area so that characters of different character sets can be written in the same general position but can be distinguished by overall size.

This invention permits automatic recognition of character sets, thereby reducing the searching and sorting requirements of mixed character set data input, particularly in Chinese and Japanese writing systems. The invention is useful in data input, word processing, and data processing in general and as a teaching aid for the teaching of writing. The invention will be better understood upon reference to the following detailed description in connection with the accompanying drawings.

BRIEF DESCRIPTION OF THE DRAWINGS

FIG. 1 is a block diagram of a system adapted to employ the inventive method.

FIG. 2 is a diagram of a tablet face illustrating a first embodiment of the invention.

FIG. 3 is a diagram of a tablet face illustrating a second embodiment of the invention.

DESCRIPTION OF SPECIFIC EMBODIMENTS

Turning to FIG. 1 there is shown a block diagram of a generalized data input system 10 adapted to employ the method according to the invention. The system 10 includes a registration means such as an x-y tablet 12 of conventional design which is for example responsive to pressure applied on a face 14 to generate output signals representative of the location of a registration instrument within a field on the face 14. Output signals are provided to a character set discriminator 16 whose function is to distinguish among the character sets expected to be employed with the x-y tablet 12. According to the invention, discrimination among different character sets is determined by examination of the size or location of each cipher, as hereinafter explained. Signals recognized as representative of a first character set are routed to a first character set processor 18, wherein is located all of the functions necessary for recognition and reproduction of data employing the first character set. Similarly, signals recognized as representative of characters of a second type are routed to a second character set processor 20. Should further character sets be employed, the system may be expanded to include three or more character set processors. The processed output information, generally in the form of display generating signals, is routed to a common output device, such as a CRT display 22 or a data utilization system.

Turning to FIG. 2, there is shown a diagram 24 for a tablet face useful for illustrating a method according to one embodiment of the invention. The face 14 of the x-y tablet 12 (FIG. 1) is laid out in rows of segments 26 and 28, and specifically in rows enumerated 1 for the first rows 26 and 2 for the second rows 28. The first rows 26 are reserved for first types of characters such as Kanji. The second rows 28 are reserved for second types of characters such as Katakana. Characters registered on the first rows are always recognized as Kanji and therefore such signals are routed to the first character set processor 18 (FIG. 1) wherein the complex processing required of Kanji may be carried out and access may be had to the large Kanji vocabulary. Simpler characters, such as Katakana, may be registered only on the second rows 28. Second row signals are routed to the second character set processor where the relatively simpler and smaller character set may be processed in accordance with the processing system selected thereby. In addition, characters may be spaced laterally from one another whereby the order of the characters may be detected. As an obvious extension, a third line may be reserved for other characters. Alternatively, the second line may be reserved for all characters other than Kanji, since most other character sets of interest are likely to be relatively small and therefore may be integrated into a single character set processor 20.

FIG. 3 illustrates a still further embodiment of the invention. A face 124 comprises a grid having generally square regions A and subregions B, C, D and E wholly contained within the regions A. Two to five different character sets may be recognized by data input location by use of such a grid organization. For example, section A may be reserved for Kanji, section A being defined as any combination of at least two subsections contained therein, as illustrated by the characters 30 and 32. Section E may be reserved for Katakana or the like, as illustrated by characters 34, 36 and 38. Section B may be reserved for Arabic-style numerals as well as Latin and Greek characters, as illustrated by characters 40 and 42. Each section A is reserved for one character. If only one subsection is employed, then the character set discriminator 16 (FIG. 1) can readily recognize that the character employed is not Kanji. Similarly, if a particular subsection is employed, the choice of subsection indicates to the character set discriminator 16 which character set is intended.

The character set discriminator 16 may be readily implemented by any means for recognizing selected addresses within a two-dimensional array, since the output of an x-y tablet is a set of recognizable addresses. The face 14 of the tablet 12 may be provided with a visible background whereby a user can recognize sections and subsections. Characters may be written in a reasonably natural style with adaptation of size and character position as required by the selected face layout. For example, the subsections of each section A may be selected such that a user registers non-Kanji characters in the center of the sections A. Since non-Kanji characters are generally less complex, writing style is easily adapted to the smaller size of the defined subsections.

The invention has now been explained with reference to specific embodiments. Other embodiments will be apparent to those of ordinary skill in this art in light of this disclosure. It is therefore not intended that this invention be limited except as indicated by the appended claims.

We claim:

1. A method for recognizing at least two different sets of complex handwritten characters in a system employing a stroke recognition means, said stroke recognition means having a plurality of regions for registration of single characters, said method comprising the steps of:

inputting signals representing a character from a first set of characters to a first character set processor, including a first character set memory, within said recognition means from within a first area within one of said regions, each said region being constrained to contain only one character and each said region being constrained to be in a predetermined sequence with respect to all other of said regions, said first area being constrained to accept signals in said first set only;

inputting signals representing a character from a second set of characters to a second character set processor, including a second character set memory, within said recognition means from within a second area within said region, said second area being constrained to accept characters in said second set only; and sensing between input signals of said first area and of said second area in order to discriminate between said first character set and said second character set.

2. The method according to claim 1 wherein said first area includes at least a first portion within said second area and wherein said sensing step includes detecting for input signals in a second portion outside of said first portion in order to detect for said first set of characters.

3. The method according to claim 2 wherein said second area is entirely included within said first portion and wherein said sensing step includes detecting for the absence of input signals within said second portion in order to detect for said second set of characters.

* * * * *